US00RE37905E

(19) United States

(12) Reissued Patent

Bourner et al.

(10) Patent Number: US RE37,905 E

(45) Date of Reissued Patent: Nov. 19, 2002

(54) POWER TOOL AND MECHANISM

(75) Inventors: Michael David Bourner, Bishop Middleham (GB); Richard Llewelyn Jones, Beecroft (AU)

(73) Assignee: Black & Decker Inc., Newark, DE (US)

(21) Appl. No.: 09/469,504

(22) Filed: Dec. 22, 1999

Related U.S. Patent Documents

Reissue of:

(64) Patent No.: 5,704,433
Issued: Jan. 6, 1998
Appl. No.: 08/822,425
Filed: Mar. 21, 1997

(60) Continuation of application No. 08/540,865, filed on Oct. 12, 1995, now abandoned, which is a division of application No. 08/206,488, filed on Mar. 4, 1994, now Pat. No. 5,458, 206.

(30) Foreign Application Priority Data

Mar. 5, 1993 (GB) ..... 9304540

(51) Int. Cl.[7] ..... B25D 11/00

(52) U.S. Cl. ..... 173/48; 173/178

(58) Field of Search ..... 173/48, 178, 104, 173/109, 176

(56) References Cited

U.S. PATENT DOCUMENTS

| | | | | |
|---|---|---|---|---|
| 865,486 | A | * | 9/1907 | Gannon |
| 2,238,583 | A | * | 4/1941 | Dodge |
| 2,764,272 | A | * | 9/1956 | Reynolds |
| 2,968,960 | A | * | 1/1961 | Fulop |
| 3,252,303 | A | * | 5/1966 | Weasler et al. |
| 3,430,708 | A | * | 3/1969 | Miller |
| 3,730,281 | A | * | 5/1973 | Wood |
| 3,736,992 | A | * | 6/1973 | Zander et al. |
| 3,799,275 | A | * | 3/1974 | Plattenhardt |
| 3,809,168 | A | * | 5/1974 | Fromm |
| 3,834,468 | A | * | 9/1974 | Hettich et al. |
| 3,955,628 | A | * | 5/1976 | Grozinger et al. |
| 4,098,351 | A | * | 7/1978 | Alessio |
| 4,215,594 | A | * | 8/1980 | Workman, Jr. et al. |
| 4,274,304 | A | * | 6/1981 | Curtiss |
| 4,366,871 | A | * | 1/1983 | Dieterle et al. |
| 4,489,792 | A | * | 12/1984 | Fahim et al. |
| 4,522,270 | A | * | 6/1985 | Kishi |
| 4,567,950 | A | * | 2/1986 | Fushiya et al. |
| 4,585,077 | A | * | 4/1986 | Bergler |
| 4,823,885 | A | * | 4/1989 | Okumura |
| 4,895,212 | A | * | 1/1990 | Wache |
| 4,898,249 | A | * | 2/1990 | Ohmori |
| 4,986,369 | A | * | 1/1991 | Fushiya et al. |
| 5,005,682 | A | * | 4/1991 | Young et al. |
| 5,025,903 | A | * | 6/1991 | Ellingson |
| 5,343,961 | A | * | 9/1994 | Ichikawa |
| 5,379,848 | A | * | 1/1995 | Rauser |

FOREIGN PATENT DOCUMENTS

| | | | |
|---|---|---|---|
| CH | 405191 | * | 7/1966 |
| DE | 1478982 | * | 1/1970 |
| DE | 2438814 | * | 3/1976 |
| DE | 2715682 | * | 10/1978 |
| DE | 4004464 | * | 1/1991 |
| DE | 4038502 | * | 6/1992 |
| EP | 0399714 | * | 11/1990 |
| GB | 1346537 | * | 2/1974 |
| GB | 1366572 | * | 9/1974 |

* cited by examiner

*Primary Examiner*—Scott A. Smith

(74) *Attorney, Agent, or Firm*—Harness, Dickey & Pierce, P.L.C.

(57) ABSTRACT

A power tool has an application mechanism (300) for connection to the output of an epicyclic gearbox provided with a torque control ring. The mechanism has a body (310) journalling a chuck spindle (302). Outside the body is a clutch control arrangement comprising balls (334,336) pressed against the torque control ring by individual springs (330) controlled by a control ring (322) threaded on the body. The mechanism includes a hammer arrangement having rotary and fixed ratchet plates (378,376) and cam ring (308) operable to engage and separate the plates by a lever (360) which projects between the springs (330).

32 Claims, 7 Drawing Sheets

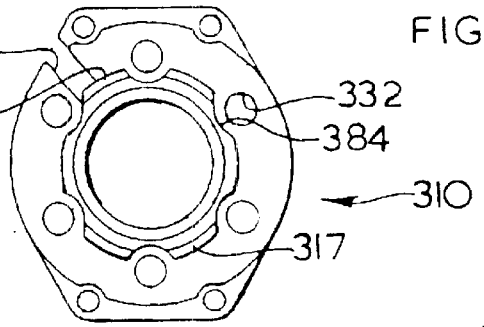
FIG. 5a
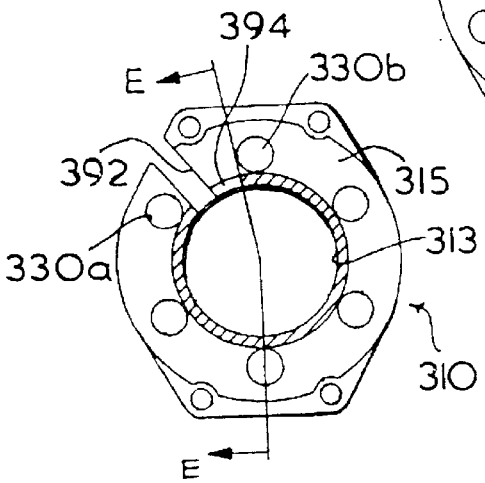
FIG. 5b
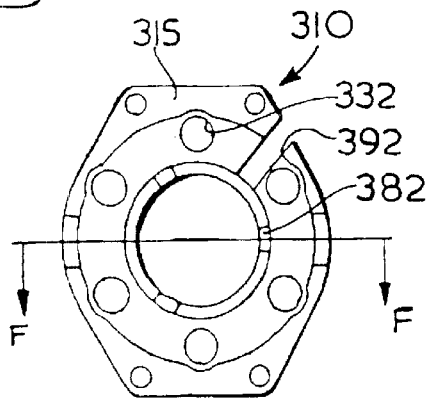
FIG. 5c
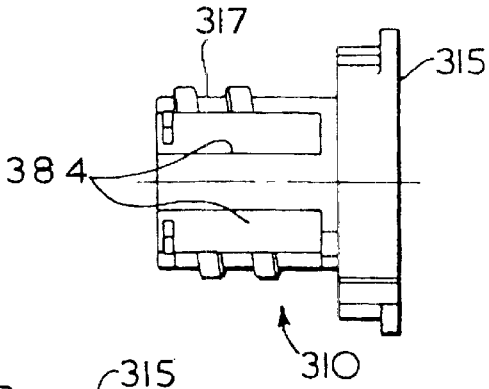
FIG. 5d
FIG. 5e
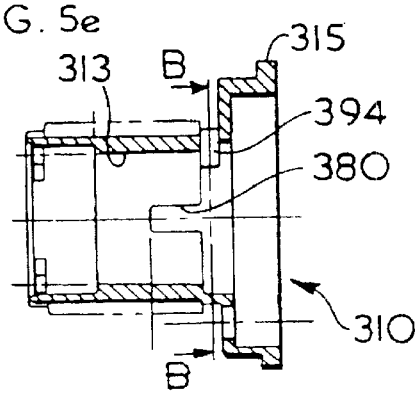
FIG. 5f
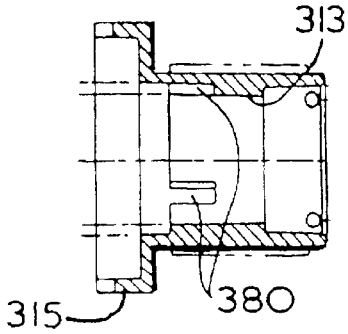

384
402a
D
D
360
402
400b
308
384

360
308
309a
311
309a 360
309a
308
B
309a
311
B 386
390
388

390
386
388

386
388
B
B

D
D
377
309b
376

377
309b
379
376
307
375

F
F
375
307
376

307
376
375
377
379

8c
376
379
375
307
309b

307

323
322
400a
C
343
318
C

322

322
318
343

322
318

POWER TOOL AND MECHANISM

Matter enclosed in heavy brackets [ ] appears in the original patent but forms no part of this reissue specification; matter printed in italics indicates the additions made by reissue.

This application is a continuation of divisional application Ser. No. 08/540,865, filed Oct. 12, 1995, now abandoned which is a divisional of application Ser. No. 08/206,488, filed Mar. 4, 1994, Now U.S. Pat. No. 5,458,206.

BACKGROUND OF THE INVENTION

This invention relates to power tools and particularly to an application mechanism for a power tool of the type comprising a housing, a motor mounted in said housing, a gearbox having an input end mounted on said motor and an output end adjacent an aperture in the housing, the gearbox being epicyclical and including a torque control ring which, when held stationery with respect to said housing, permits the gearbox to transmit torque and which, when permitted to rotate in the housing, disables torque transmission by the gearbox.

In such power tools it is known to dispose an application mechanism on the output end of the gearbox, which mechanism comprises a resiliently biased, adjustable actuating means mounted on said body to selectively engage said torque control clutch ring.

Adjustment of the actuating means varies the engagement with said torque control clutch ring thereby varying the torque at which it begins to slip and at which transmission by the gearbox to its output shaft is stopped.

It is also known to lock the torque control ring so that it is not employed and so that no torque limitation is provided. In this instance, it is also known to dispose an application mechanism on the output end of the gearbox, which mechanism comprises a hammer arrangement whereby oscillating axial vibration can selectively be imposed on the rotary drive supplied by the gearbox.

Finally, it is also known from DE 4038502 to provide an arrangement as first described above, i.e. a tool having a torque control mechanism mounted on the output end of the gearbox, but where a hammer mechanism is added on the front end of the torque control mechanism. Such an arrangement is versatile because it can be employed in various different ways. However, it suffers from being somewhat long having first a motor, then a gearbox, then a torque control mechanism, then a hammer mechanism, all one after the other.

It is also known to employ electronic torque control whereby the torque applied is fed back to an electronic control module and, if the applied torque exceeds the torque preset in the control module, power is disconnected from the motor. Thus if a hammer mechanism is on the front of the gearbox there is no penalty in terms of compactness in providing both torque control and a hammer facility but, of course, the electronics do add cost and complexity.

It is therefore, an object of the present invention to provide a power tool which has this versatility and yet remains compact but which is still simple and relatively inexpensive.

BRIEF DESCRIPTION OF THE INVENTION

In accordance with the present invention there is provided a power tool comprising a housing, a motor mounted in said housing, a gearbox having an input end mounted on said motor and an output end adjacent an aperture in the housing, the gearbox being epicyclical and including a torque control ring which, when held stationery with respect to said housing, permits the gearbox to transmit torque and which, when permitted to rotate in the housing, disables torque transmission by the gearbox; and an application mechanism driven by said gearbox, which mechanism comprises:

a) a substantially cylindrical hollow body;

b) a chuck drive spindle journalled in said body and defining therebetween an annular space;

c) means limiting axial movement of said spindle in said body towards said gearbox;

d) a rotary ratchet plate fixed on said spindle;

e) a facing fixed ratchet plate in said body;

f) means to engage said ratchet plates together such that on rotation of the spindle a reciprocating action is imposed thereon, said means including a lever projecting through a slot in said body;

g) resiliently biased, adjustable actuating means mounted on said body to selectively engage said torque control clutch ring, said lever projecting through said actuating means.

BRIEF DESCRIPTION OF THE DRAWINGS

The invention is further described hereinafter, by way of example only, with reference to the accompanying drawings, in which:

FIGS. 5a through f are different views of the mechanism body: a is a front view, b is a section on the line B—B in FIG. 5e, c is a rear view, d is a side elevation, e, is a section on the line E—E in FIG. 5b, and f is a section on the line F—F in FIG. 5c;

DETAILED DESCRIPTION OF THE DRAWINGS AND EMBODIMENT

Figure 1:
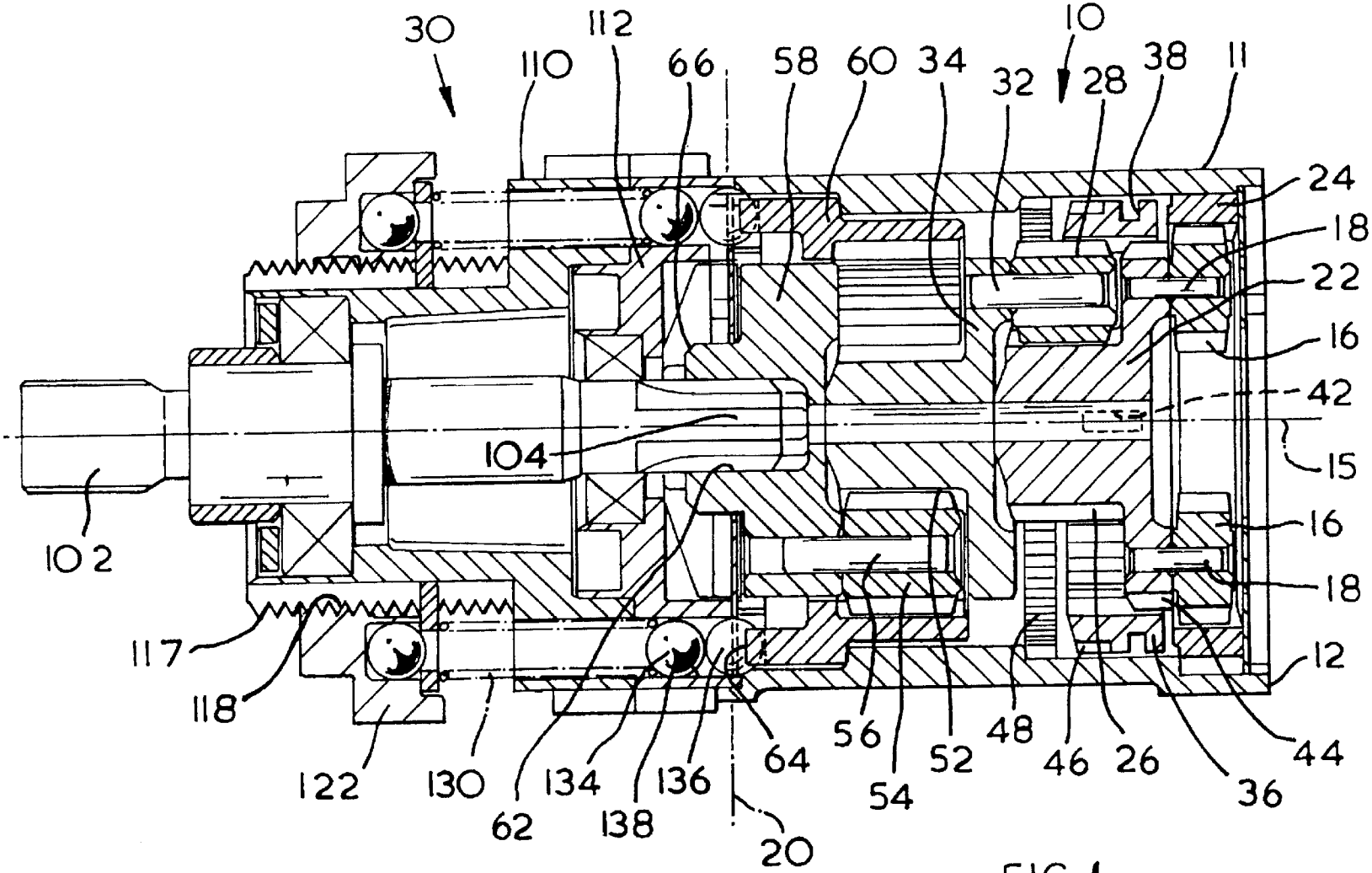
FIG. 1 is a side section through a gearbox and torque control clutch of the type to which the present invention relates.

In FIG. 1, a gearbox 10 drives a torque control clutch mechanism 30 to which it is connected at interface 20. Interface 20 is the output end of the gearbox and input end of the mechanism 30. Input end of the gearbox 10 is connected to a motor [(not shown)] *13* (*FIG. 2*) which has a spur gear (not shown) meshing with first stage planet gears 16 of the gearbox 10.

Planet gears 16 are journalled for rotation about their axes 18 on a first stage carrier 22. A planet ring 24 is fixed in housing 11 of the gearbox 10. The planet ring 24 has internal gears which mesh with the planets 16. Thus as the spur gear rotates the planets 16, they in turn are obliged to rotate about central axis 15 running around planet ring 24. In so-doing, first stage carrier 22 rotates about axis 15 at some speed less than the speed of rotation of the input spur gear. Hence a first speed reduction is achieved.

The carrier 22 has its own spur gear 26 driving second stage planets 28. Planets 28 are likewise journalled for rotation about their own axes 32 on a second stage carrier 34. A second stage planet ring 36 has internal gears for meshing with the second stage planets 28.

However, the second planet ring 36 has two axial positions giving different results. It has an external circumferential groove 38 into which project fingers (not shown) of a gear selector (through windows 42 of the housing 11) in order to shift the planet ring between its two positions when the gear selector is operated.

In the position shown in FIG. 1, the ring 36 is in its high speed position where its gear teeth mesh with teeth 44 formed around the outside of first stage carrier 22. Thus the ring 36 is locked on the carrier 22 and rotates with it. Thus the planets 28 do not rotate about their own axes but merely transmit the rotation of the first stage carrier 22 directly to the second stage carrier 34 with no speed reduction.

If, however, the ring 36 is shifted leftwardly in the drawing to its low speed position, its teeth are disengaged from the first stage carrier 22. However, on disengagement therefrom, teeth 46 on the outside of the ring 36 engage corresponding teeth 48 in the housing 11 so as to lock the ring 36 in the housing 11. Now, not only are the planets 28 free to rotate about their axes 32, they are positively obliged to by their engagement with the teeth of the, now stationary, planet ring 36. Thus the planets 28 also orbit about axis 15 transmitting reduced speed drive to the second stage carrier 34.

Finally, the carrier 34 likewise has a spur gear 52 which drives third stage planets 54. The planets 54 are journalled for rotation about their own axes 56 on an output carrier 58. A clutch control ring 60 is the planet ring for the planets 54 and is selectively rotatable in the housing 11. It is normally stationary in the housing 11 and consequently drive from the spur gear 52 is transmitted through the planets 54 to the output carrier 58. The torque applied to the carrier 58 is equal to the torque applied to the control ring 60. Thus, if the ring 60 is allowed to slip, zero torque is applied to the carrier. The degree to which the ring 60 is allowed to slip is the principle behind the torque control of this mechanism.

Clutch mechanism 30 shown in FIG. 1 is employed to exercise the control of the slippage of control ring 60. The mechanism comprises a housing body 110 in which is journalled a chuck spindle shaft 102. The shaft 102 extends through an end cap 112 and has a spined end 104 which engages a correspondingly splined bore 62 of the output carrier 58.

The housing body 110 has a threaded surface 117 adapted to receive corresponding threads 118 on a clutch preset ring 122. Clutch ring 122 presses springs 130 against clutch balls 134,136 received in bores 138 disposed around the end cap 112. The balls 136 engage a castellated surface 64 of the control ring 60. If the torque on the control ring is sufficient, the balls 136 ride over the castellations 64 and the ring spins removing drive to the chuck spindle shaft 102. By rotating the clutch ring 122, the springs 130 can be compressed increasing the torque required before the balls ride over the castellations, and hence the torque limit applied to the shaft 102.

A more detailed description is now given with reference to the remaining drawings showing a combination mechanism 300 *containing a hammer drill mechanism and a torque control mechanism and providing a tool operable in a drill mode, a driver mode and a hammer drill mode* according to the present invention.

Figure 2:
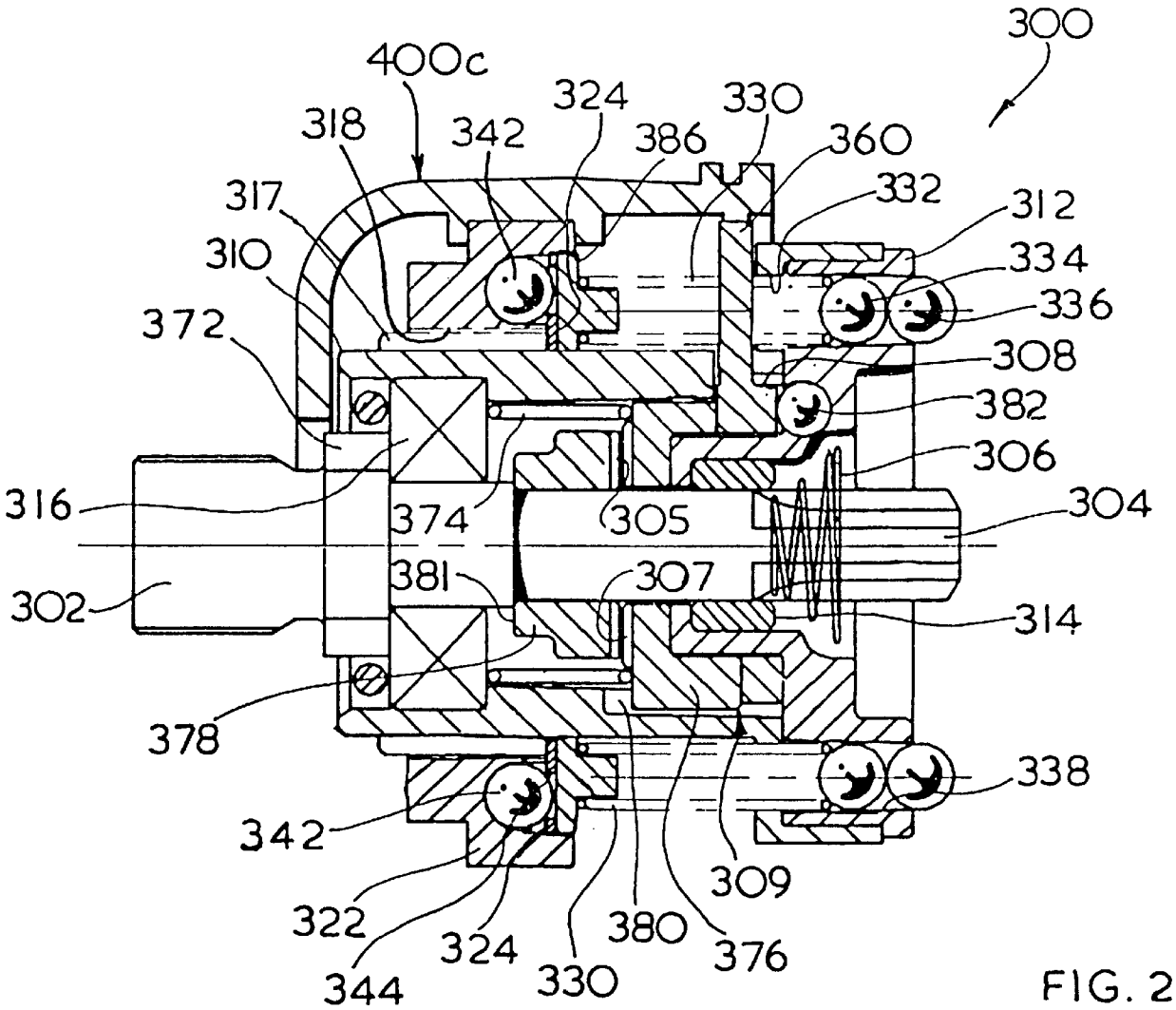
FIG. 2 is a side section through a combination mechanism according to the present invention.

In FIG. 2, *power tool 301 comprises a housing 303, a motor 305 mounted in the housing 301, and the epicycle gear box 10 having an input end mounted on the motor and an output end adjacent to an aperture in housing 303. Tool 301 further comprises* a mechanism 300, *is connected to the output of gearbox 10 and* [has] *having* a housing body *or subhousing* 310 mounting through a front bearing 316 a chuck spindle shaft 302. An end cap 312 closes the other end of the housing and has a bearing bush 314 mounting the input end 304 of the spindle 302. This end 304 is splined for driving connection with [a] gearbox *10* [(not shown in this drawing)] and has a preload spring 306 serving to preload both the gearbox and the mechanism 300; the latter by pressing the shaft 302 leftwardly in the drawing. The spring 306 presses against shoulder 66 of the output carrier 58 (see FIG. 1).

FIG. 2 (*showing the disabled mode of the hammer drill mechanism*) shows the position of the spindle 302 in the body 310 that is adopted when pressure is applied by the user through the housing *303* of the tool *301* [(neither shown)] and pressing a tool bit (not shown) mounted on the end of spindle 302 against a workpiece. Thus a flange 372 on the spindle 302 abuts the bearing 316 preventing further rightward travel.

A spring 374 presses a fixed ratchet 376 against a cam ring 308 which has an externally operable knob *or arm* 360. In the position shown (*i.e., the disabled mode of the hammer drill mechanism*), the cam ring allows sufficient rightward movement of the ratchet 376 for its ratchet teeth 307 to clear those 305 of a rotary ratchet 378 fixed on the chuck spindle shaft 302.

Figures 6A, 6B, 6C, 6D, 7A, 7B, 7C:
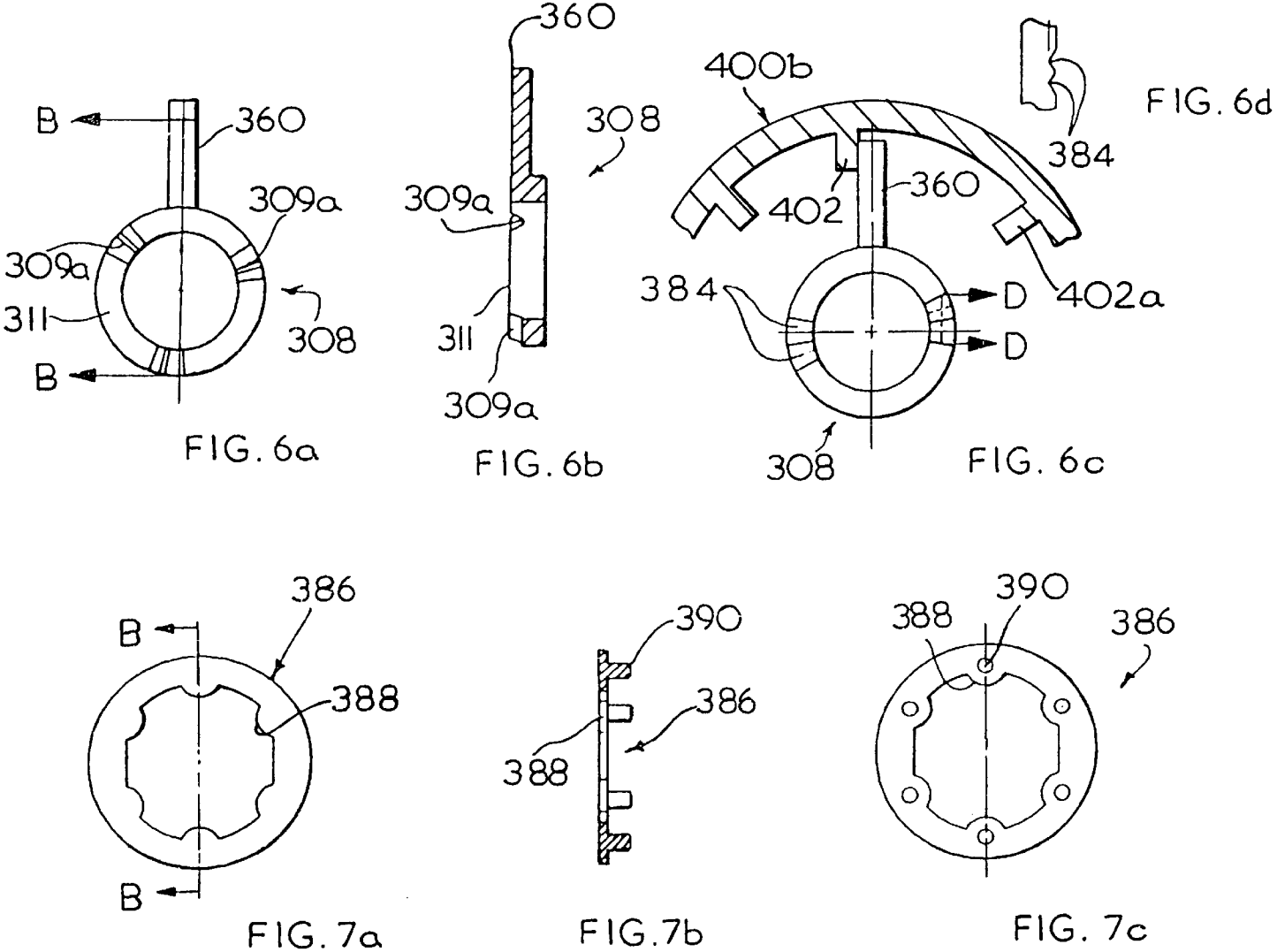
FIGS. 6a through d are different views of a hammer cam ring: a is a front view, b is a section on the B—B in FIG. 6a, c is a rear view, and d is a part section on the line D—D in FIG. 6c.
FIGS. 7a through c are different views of a spring support ring: a is a front view, b is a section on the line B—B in FIG. 7a, and c is a rear view.
Figures 8A, 8B, 8C, 8D, 8E, 8F:
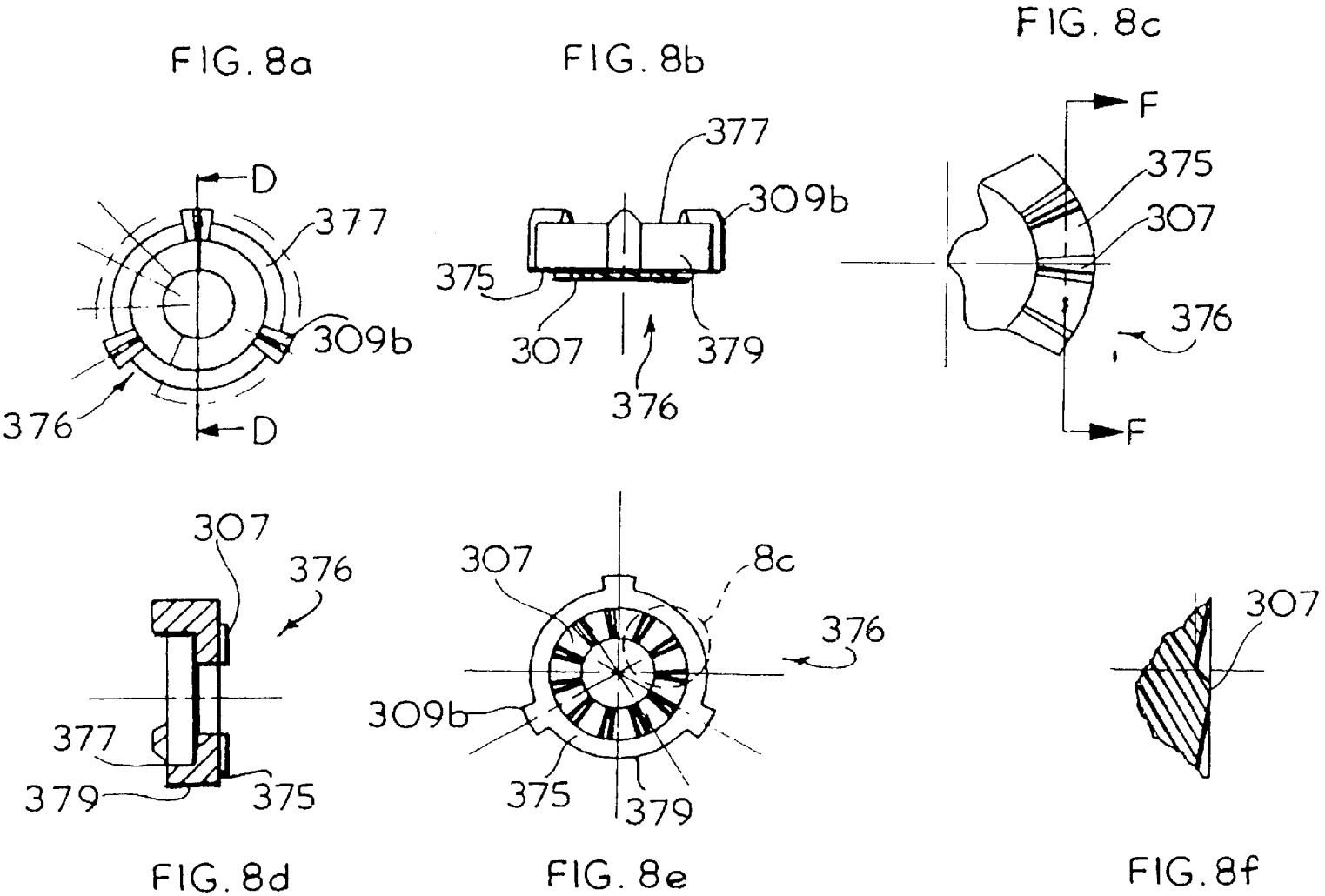
FIGS. 8a through f are different views of a hammer fixed ratchet: a is a rear view, b is a side elevation, c is detail 8c in FIG. 8e, d is a section on the line D—D in FIG. 8a, e is a front view, and f is a part section on the line F—F in FIG. 8c; and, FIGS. 9a through d are different views of a clutch preset ring: a is a front view, b is a rear view, c is a side section on the line C—C in FIG. 9a, and d is a detail of the thread formation 318 in FIG. 9c.

Cam ring 308 is shown in more detail in FIGS. 6a, b and c where it can be seen that it comprises a ring having cam notches 309a in one front surface 311. The rear surface thereof is provided with detents 384 referred to further below.

The cam notches 309a co-operate with cam knobs 309b on the fixed ratchet 376 shown in more detail in FIGS. 8a to f. The fixed ratchet 376 is annular, having front and rear surfaces 375, 377 respectively and an outer cylindrical surface 379. The outer cylindrical surface 379 is a close sliding fit in the body 310. The cam knobs 309b extend radially outwardly from the surface 379 and slide axially in slots 380 in the body 310 so that rotation of the ratchet 376 is precluded. The knobs 309b also extend axially beyond surface 377 and engage cam notches 309a of the cam ring 308. In this position, there is no hammer action.

If, however, the knob 360 is operated to rotate the cam ring 308 about its axis through a small angle, cams 309 disengage and press the fixed ratchet leftwardly in the drawings against the pressure of spring 374. Having moved the fixed ratchet leftwardly, its ratchet teeth 307 can now be reached by those on the rotary ratchet 378 when the latter is pressed rightwardly on user pressure on the tool bit. *As will be appreciated, the cam ring 308 has been moved from a first position corresponding to the disabled mode of the hammer drill mechanism to a second position corresponding the enable mode of the hammer mechanism.* Until such time however, spring 306 presses the spindle 302 leftwardly until front surface 381 of the rotary ratchet 378 abuts the bearing 316. Here, even when the cam 308 is operated, the ratchets 307 to not engage so that, until the user engages the workpiece and moves the spindle rightwardly, the spindle rotates without reciprocation.

Ratchet teeth 307 are shown in FIGS. 8b to f and are formed on front surface 375 of the fixed ratchet 76. Ratchet teeth 305 on the rear surface of rotary ratchet 378 correspond.

However, when knob 360 is operated to move fixed ratchet 376 leftwardly in FIG. 2 and pressure on the drill chuck is applied to move chuck spindle 302 and its rotary ratchet 378 rightwardly in FIG. 2, ratchet teeth 305,307 engage one another and impart an oscillating axial movement on the chuck spindle 302 creating the hammer action which assists drilling certain materials such as masonry.

End cap 312 has two balls 382 seated facing the back surface 311 of ring 308 which has the two detents 384. The balls 382 snap into and out of engagement with the detents 384 when the knob 360 is operated to rotate the cam ring 308 between its two positions. There are thus two detents 384. The ring must move leftwardly slightly against the pressure of spring 374 in order to accommodate the balls 382 snapping into and out of the detents 384. No extra spring is required.

The combination mechanism 300 further comprises a torque control arrangement *providing operation of the tool in the drill and the driver modes* substantially as described above with reference to FIG. 1. The end cap 312 has a series of bores 338 around its periphery which each house a pair of clutch balls 334,336. These are pressed by individual clutch springs 330 which ultimately bear against a clutch ring 322 which has a coarse internal thread 318 which matches a corresponding thread 317 partially formed around the body 310.

Referring to FIGS. 5a to f, the body 310 is substantially cylindrical with a hollow bore 313 and a flanged rear end 315. Into the flanged end 315 fits the end cap 312. Bores 332 are formed in the flange 315 and these bores correspond in number and position with the bores 338 of the end cap 312.

The body 310 has a series of scallops 384 corresponding with each opening 332 of the body and which receive the springs 330. The scallops locate a metallic support ring 324 and a plastics guide ring 386. Both these elements have internal bulges 388 which enter the scallops 384 and prevent rotation of the rings 324,386 as the clutch ring 322 is turned. See FIGS. 7a to c for greater detail of the guide ring 386.

The clutch ring 322 mounts two balls 342 in openings 343 which snap into and out of engagement with a plurality of detent apertures 344 (see FIG. 2) spaced around the support ring 342. As the clutch ring is turned, the balls 342 press the rings 324,386 against the pressure of springs 330. Again, no separate springs are required for this detent feature. The guide ring 386 has a series of mounting pegs 390 which each locate one of the springs 330. This ensures that the springs remain in line.

The springs 330 press the balls 334,336 against control ring 60 in the epicyclic gearbox 10. If the gear ring is allowed to rotate in the gearbox, the gearbox ceases to transmit any torque to the spindle 304. Thus the more strongly the balls 336 are pressed against that ring, the greater the torque must be before it will be sufficient to turn the ring under the balls. Hence [the possibility] *it is possible* to tighten the pressure on the balls by screwing the clutch ring 322 onto the body 310 further compressing the springs 330. Indeed, in order to rotate, the control ring must lift the balls 334,336 to a small extent to climb the ramps or castellations on the control ring. It is possible to tighten the springs so much that they become coil bound and prevent any lift of the balls 334,336. In this instance, there is no torque limit beyond that capable of being generated by the motor and gearbox. *As will be appreciated, the tool is set in the driver mode when the torque is limited. And the tool is set in the drill mode when the torque in unlimited.*

It is to be noted that the knob 360 of the hammer mechanism cam ring 308 extends between the springs 330. Indeed, a slot 392 is formed in the flange 315 of the body 310 to allow insertion of the ring 308 and this slot extends circumferentially in the appropriate axial position at 394 (see FIG. 5b) to provide the requisite arc of movement of the knob 360 between two springs (at 330a, 330b in FIG. 5b) to engage and disengage the cams 309.

Thus it can be seen that the combination of a clutch and hammer mechanism is achieved within essentially the same confines as a conventional clutch mechanism.

Figure 3:
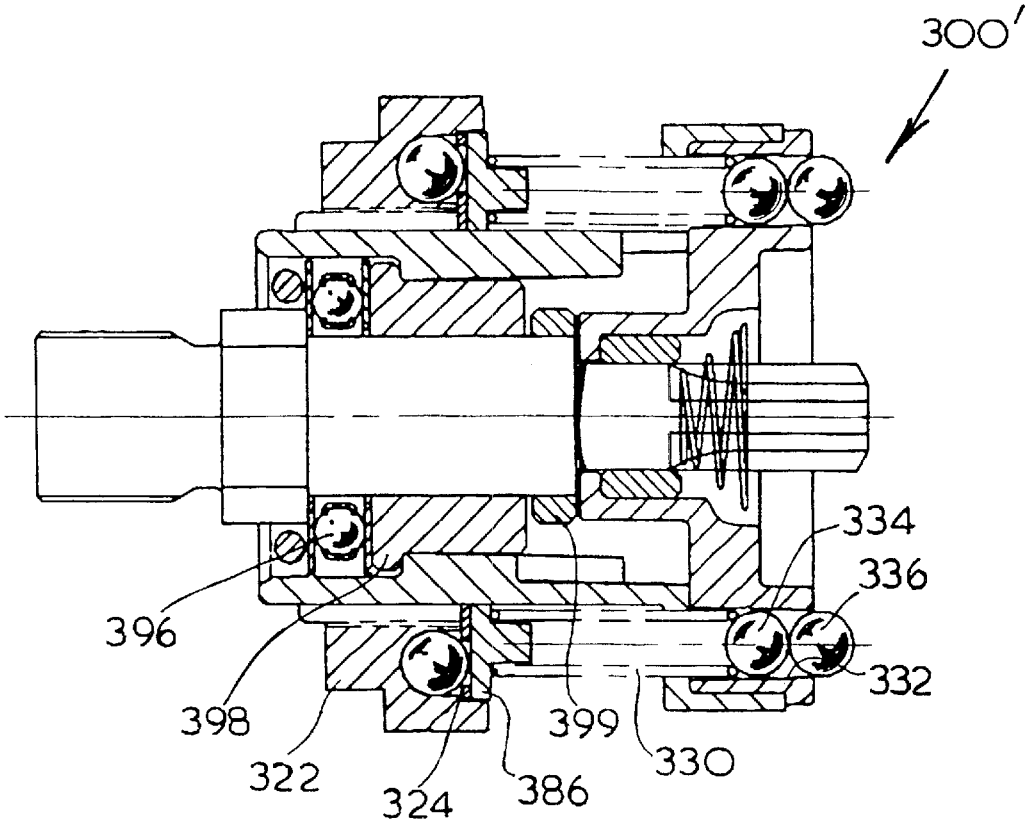
FIG. 3 is a side section through the mechanism of FIG. 2, adapted to have a torque control clutch feature only.

However, not only is this combination a first aspect of the present invention, but also there is the possibility to provide several different options using essentially the same components. Although not shown, the most basic mechanism for attachment to the gearbox of FIG. 1 is a straight transmission and this is similar to that shown in FIG. 3. This shows a simple clutch mechanism 300'. Because the hammer action is not required, the moderately expensive bearing 316 of FIG. 2 is replaced by a thrust ring 396 and bearing bush 398. The bush 398 is retained by press ring 399. While being cheaper, this arrangement is too long to accommodate the hammer mechanism.

To render this arrangement as a basic straight transmission, it is only a matter of removing the clutch ring 322, rings 324 and 386, springs 330 and balls 334,336. However, some arrangement needs to replace ball 336 to ensure that the control ring 60 is locked. This may comprise a ring of pegs or the like which fit in the bores 332 and protrude sufficiently to lock the ring.

Figure 4:
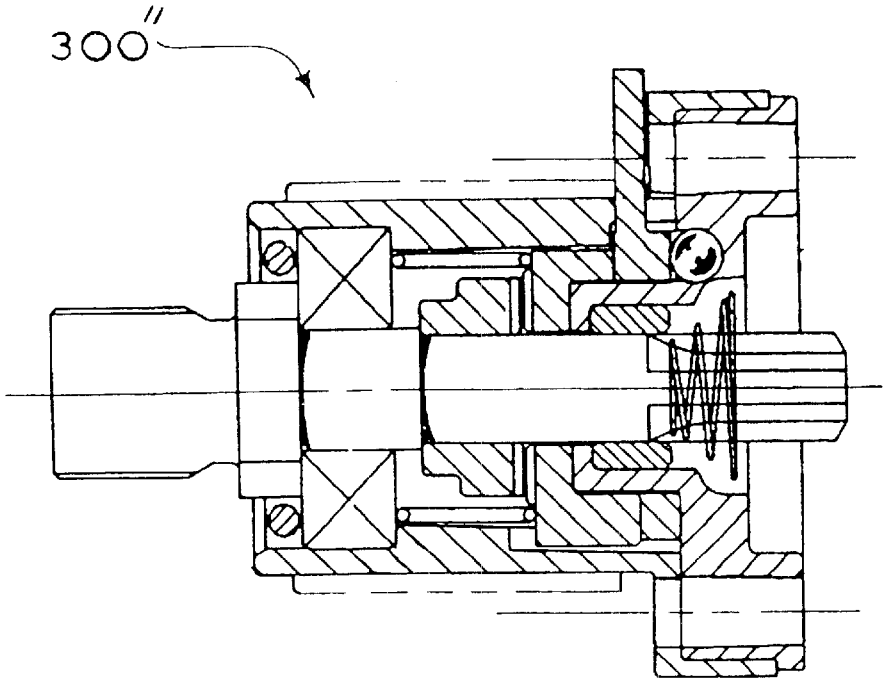
FIG. 4 is a side section through the mechanism of FIG. 2, adapted to have a hammer feature only.

Conversely, as shown in FIG. 4, it is likewise simple to render the mechanism 300 as a straight hammer mechanism 300". This is achieved by removing the components mentioned above relating to the clutch mechanism from the mechanism 300 of FIG. 2, although, again, some locking means is required for the clutch control ring 60 of the gear box 10.

Thus using essentially the same components, four options for an application mechanism to be connected to the gearbox 10 can be envisaged: that is to say, firstly, a straight transmission offering no features other than minimum cost; secondly, a clutch mechanism simply by the addition of several components; thirdly, a hammer mechanism, by exchange of some components of the straight transmission and the addition of a few others; and fourthly, a combination mechanism offering both hammer and clutch facilities, achieved by adding the clutch components to the hammer mechanism.

Figures 9A, 9B, 9C, 9D:
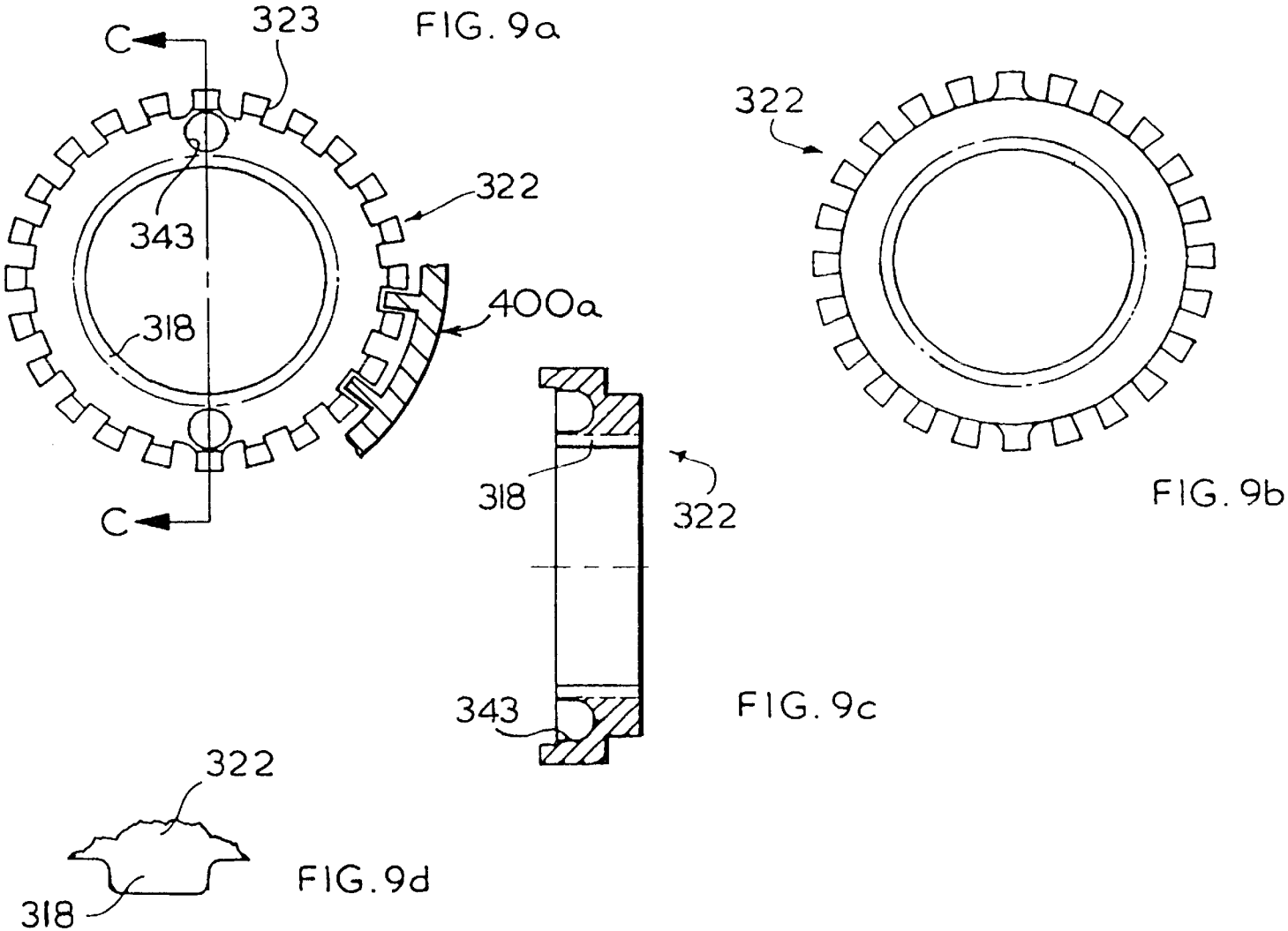

It is to be borne in mind that all of these options are available in a particularly cost effective manner if the housings for the power tools including these components are terminated at the interface 20 between the gearbox and mechanism and if a nose ring is connected to that housing at the interface and wherein the nose ring is adapted for the particular mechanism. Thus where the mechanism is a straight transmission, the nose ring is nothing more than an extension of the housing. Where the mechanism is the simple clutch mechanism, [the] *a* nose ring *400a* is arranged rotatable in the housing and *as partially shown in FIG. 9a,* is connected to the clutch ring 322 (by interaction with castellations 323, for example, on the clutch ring 322) so as to enable turning of the clutch ring and axial sliding thereof inside the nose ring. Where the mechanism is a simple hammer mechanism, [the] *a* nose ring *400b, partially shown in FIG. 6c* is rotatable between two positions and connected to knob 360. Finally, in the combination mechanism, two axially disposed nose rings are used, the rear most one operating knob 360 as mentioned above, and the second, front nose ring being rotatable on the rear nose ring and operating the clutch control ring 322.

Alternatively, and this is preferred, a single nose ring is *400c partially shown in FIG. 2* employed to control both the knob 360 and the clutch ring 322 *in the same manner as nose rings 400b and 400a, respectively, as described above.* Here a spring is disposed in the end cap 312 to urge the knob 360 towards its non-hammer mode position. A ledge *402* in the nose ring *400c* abuts the knob 360 and moves it towards its hammer mode position.

The spring is conveniently a single coil in a radial plane in the end cap with one end bent axially backwards into a hole in the end cap and the other next to the knob 360 holding it in its non-hammer mode position. The knob 360 and threads 317,318 are arranged so that movement of the knob to its hammer mode position is in the same direction as required for tightening of the clutch control ring 322 on the body 310.

Thus, in operation, one ledge *402* in the nose ring *400c* abuts the knob 360 on the same side as the spring and prevents the nose ring *from* being rotated further in that direction. In this non-hammer mode position, the knob 360 cannot move further in that direction because it abuts one edge of the slot 394 in the body 310. Also in this position, the control ring 322 is arranged at its loosest position, that is to say, most separated position with respect to the end cap 312.

If the nose ring *400c* is now rotated in the opposite direction, the ledge *402* leaves the knob 360. The control ring 322 progressively tightens through progressively increasing torque transmission modes *corresponding to driver mode settings*. Finally, a position is reached when the springs 330 do not allow balls 336 to raise sufficiently from the gear ring 60 to permit any rotation thereof. Here the nose ring *400c* indicates that the tool is in drill mode. Also in this position, the ledge *402* (or another one *402a* (*FIG. 6c*)) abuts the other side of the knob 360 remote from the spring. Thus a final twist of the nose ring *400c* turns the knob 360 against the pressure of the spring to its hammer mode position.

This sequence and arrangement is of course possible because in both drilling and hammer modes of operation of a power tool, there is no requirement for torque control. Similarly, in screw-driving mode (where torque control is of course useful) there is no need for the hammer action.

We claim:

1. A power tool comprising:

a housing;

a motor mounted in the housing and having an output shaft;

an epicyclic gearbox mounted in the housing and having an input end mounted on the motor and an output end;

an aperture in the housing, said output end of the gearbox being adjacent said aperture;

a drive spindle and a torque control ring of the gearbox, which control ring, when held stationary relative to the gearbox, permits the gearbox to transmit torque to said drive spindle and which, when permitted to rotate in said gearbox, disables said torque transmission;

an application mechanism including an actuator engaged with, and resiliently biassed towards, said torque control ring, and an adjustment element displaceable on said application mechanism to adjust the engagement of said actuator with said torque control ring;

a chuck shaft driven by said drive spindle;

a hammer mechanism engaged with said drive spindle and adapted to impart a superimposed oscillatory motion on the drive spindle and to said chuck shaft, said hammer mechanism including an engagement element, which engagement element in a first position thereof enables said hammer mechanism and in a second position thereof disables said hammer mechanism; and a nose ring rotatable on said housing about said aperture thereof which actuates both said adjustment element of the application mechanism and said engagement element of said hammer mechanism.

2. A power tool according to claim 1, wherein said application mechanism has a body, and said adjustment element is screw threaded on said body, and wherein said nose ring serves to rotate said adjustment element so that it advances towards and retreats from said torque control ring to adjust said resilient bias.

3. A power tool according to claim 2, wherein a spring is disposed between said actuator and adjustment element to provide said resilient bias.

4. A power tool according to claim 3, wherein a plurality of springs is disposed around said body.

5. A power tool according to claim 1, wherein said actuator is a ball.

6. A power tool according to claim 4, wherein said actuator is a plurality of balls, at least one between each spring and said torque control ring.

7. A power tool according to claim 1, wherein said hammer mechanism has a body and comprises a rotary ratchet plate fixed on said chuck shaft, and an axially adjustable facing ratchet plate rotationally fixed in the body.

8. A power tool according to claim 7, wherein said engagement element comprises a cam ring angularly adjustable in said body to move said ratchet plates together or apart to engage or disengage respectively the hammer mechanism.

9. A power tool according to claim 8, wherein said cam ring includes a lever actuated by said nose ring on rotation thereof relative to the housing.

10. A power tool according to claim 7, wherein a return spring is disposed between said engagement element and body and biases said engagement element towards its second position in which it disables said hammer mechanism.

11. A power tool according to claim 10, wherein said cam ring includes a lever, which lever is actuated by said nose ring upon rotation thereof relative to the housing only when there is a maximum pressure engagement of said actuator with said torque control ring, actuation of the lever by the nose ring serving to move said lever against the pressure of said return spring to the first position of the engagement element in which said hammer mechanism is disabled.

12. A power tool comprising:

a housing;

a motor in the housing;

a gearbox in the housing connected to the motor;

a rotary output spindle, driven by the gearbox;

a torque control mechanism, to control adjustably the torque output of the gearbox and thereby the torque applied to said output spindle; and a hammer mechanism, selectively enabled to impart axial oscillations on said output spindle;

a nose ring rotatably mounted on said housing about said mechanisms and for adjusting the torque control mechanism and enable the hammer mechanism.

*13. The power tool of claim 12 wherein the hammer mechanism further comprises:*

*a first ratchet mounted to the output spindle for rotation therewith;*

*a cam member axially displaceable in response to limited rotary movement thereof between first and second axial positions and operative to enable said hammer mechanism when moved from the first position to the second position; and*

*a second ratchet engaged with the first ratchet and fixed against rotation with respect to said output shaft when the cam member is in the second position.*

*14. The power tool of claim 13 wherein the axial displacement of the cam member controls the engagement and disengagement of the hammer mechanism.*

*15. The power tool of claim 14 wherein the cam member is rotatably mounted on the output shaft for limited rotary movement.*

*16. The power tool of claim 15 further comprising:*

*a subhousing containing the hammer mechanism, having a sidewall and having an opening through the sidewall;*

*the cam member having an arm projecting through the sidewall; and*

*the nose ring comprising a rib engageable with the arm of the cam member for removing the cam member through the limited rotary movement to displace the cam member between the first and second axial positions.*

*17. A power tool having hammer, drill and driver modes comprising:*

*a main housing;*

*a motor in the housing;*

*a gear box connected to and driven by the motor;*

*a combination mechanism selectively operating in hammer, drill and driver modes and comprising:*

*a subhousing;*

*a chuck shaft connected to and driven by the gear box;*

*the chuck shaft rotatably and axially slidably mounted in the housing body;*

*hammer mechanism located in the subhousing and comprising;*

*a first ratchet fixed to the chuck shaft;*

*a second ratchet fixed relative to the housing body to cause the chuck shaft to axially reciprocate when in the hammer mode;*

*a cam having a first position to disable the hammer mechanism and a second position to enable the hammer mechanism;*

*the cam having a knob for moving the cam between first and second positions;*

*a torque control clutch lockable in the drill mode, settable in a plurality of torque settings in the driver mode, mounted on the subhousing and comprising:*

*an actuator engageable with the gear box to adjust the torque output of the gear box to the chuck shaft in the driver mode and to set the gear box in the drill mode;*

*a control ring adjustably mounted on the subhousing for setting the actuator and thereby the torque output of the gear box; and*

*a nose ring rotatably mounted on the subhousing, engageable with the control ring to set the torque output of the gear box and engageable with the cam knob to shift the cam between the first and second positions to enable and disable the hammer mechanism.*

*18. The tool of claim 17 wherein:*

*the cam in the second position fixes the second ratchet in the subhousing in a location for rotary sliding engagement of the first ratchet relative to the second ratchet.*

*19. A power tool having hammer, drill and driver modes comprising:*

*a main housing;*

*a motor in the housing;*

*a gear box connected and driven by the motor;*

*a combination mechanism selectively operable in hammer, drill and driver modes and comprising:*

*a subhousing;*

*a chuck shaft connected to and driven by the gearbox;*

*the chuck shaft rotatably and axially slidably mounted in the housing body;*

*hammer mechanism located in the housing body and comprising:*

*a pair of ratchets mounted on the chuck shaft, settable in an enabled mode to cause the chuck shaft to axially reciprocate and in a disabled mode;*

*a hammer mode actuator shiftable between a first position to disable the hammer mechanism and a second position to enable the hammer mechanism;*

*a control knob attached to the hammer mode actuator and extending through the subhousing;*

*a torque control clutch lockable in the drill mode, settable in a plurality of torque settings in the driver mode, mounted on the subhousing and comprising:*

*a clutch actuator engageable with the gear box to adjust the torque output of the gear box to the chuck shaft in the driver mode and to set the gear box in the drill mode;*

*a control ring adjustably mounted on the housing body for setting the actuator and thereby the torque output of the gear box; and*

*a nose ring rotatably mounted on the subhousing, engageable with the control ring to set the torque output of the gear box and engageable with the control knob to shift the hammer mode actuator between the first and second positions to enable and disable the hammer mechanism.*

*20. A power tool having hammer, drill and driver modes comprising:*

*a main housing;*

*a motor mounted in the housing and having an output shaft;*

*an epicycle gear box located forwardly of the motor, having an output stage and having an input stage connected to and driven by the output shaft of the motor;*

*a combination mechanism located forwardly of the epicycle gear box and selectively operable in hammer, drill and driver modes and comprising:*

*a subhousing elongated in a fore and aft direction;*

*a chuck shaft extending fore and aft of the subhousing and connected to and driven by the output stage of the gear box;*

*the chuck shaft rotatably and axially slidably mounted in the subhousing;*

*a torque control clutch lockable in the drill mode, settable in a plurality of torque settings in the driver mode, mounted around the periphery of the subhousing and comprising:*

*a clutch actuator engageable with the gear box to adjust the torque output of the gear box to the chuck shaft in the driver mode and to set the gear box in the drill mode;*

*a control ring adjustably mounted on the subhousing for setting the clutch actuator and thereby the torque output of the gear box;*

*the control ring adjustable between a first fore and aft location and a second fore and aft location;*

*the interface between the clutch actuator and the gear box defining a third fore and aft location rearward of the second fore and aft location;*

*hammer mechanism located in the subhousing between the first and third fore and aft locations and comprising:*

*a pair of ratchets mounted on the chuck shaft, settable in an enabled mode to cause the chuck shaft to axially reciprocate and in a disabled mode; and*

*a hammer mode actuator shiftable between a first position to enable the hammer mechanism and a second position to disable the hammer mechanism.*

*21. The power tool of claim 20 wherein:*

*a nose ring rotatably mounted on the subhousing, engageable with the control ring to set the torque output of the gearbox and engageable with the hammer mode actuator to enable and disable the hammer mechanism.*

*22. The power tool of claim 21 wherein:*

*a plurality of the clutch actuators extends fore and aft of the subhousing and are spaced around the periphery of the subhousing,*

*the subhousing has a slot between an two adjacent ones of the plurality of clutch actuators and*

*the hammer mode actuator projects through the slot and is engageable with the nose ring.*

*23. The power tool of claim 20 wherein:*

*the subhousing having a forward section;*

*the forward section has a threaded outer wall;*

*the control ring adjustably supported on the threaded outer wall of the forward section;*

*a bearing rotatably supports the chuck shaft in the forward section of the subhousing and located adjacent to the control ring; and*

*the ratchets are located rearwardly of the bearing.*

*24. A mode control for setting the mode operation of a power tool (1) having a hammer mechanism and an epicycle gear box and (2) having hammer, drill and driver modes, the mode control comprising:*

*a subhousing for the hammer mechanism;*

*the subhousing having a sidewall and an opening in the sidewall;*

*a clutch actuator mounted around the periphery of the housing and engageable with the gear box to adjust the torque output of the gear box in the driver mode and to set the gear box in the drill mode;*

*an actuator spring for resiliently biasing the actuator;*

*a control ring adjustably mounted on the housing for setting the spring tension on the actuator and thereby the torque output of the gearbox;*

*a hammer mode actuator located in the housing, having an arm extending through the opening in the subhousing sidewall, and shiftable between a first position wherein the hammer mode is disabled to a second position wherein the hammer mechanism is enabled and*

*a nose ring rotatably mounted on the subhousing, engageable with the control ring to set the torque output of the gearbox and engageable with the hammer mode actuator arm to shift the hammer mode actuator between the first and second positions.*

*25. The mode control of claim 24 wherein the nose ring is rotatably movable on the subhousing in sequence through:*

*a group of driver mode settings for adjusting the control ring for setting and progressively increasing the spring tension applied to the actuator in the driver mode and thereby the torque output in the drill mode;*

*a drill mode setting for adjusting the spring tension to disable the driver mode and set the epicyclic gear box in the drill mode; and*

*a hammer mode setting for moving the hammer mode actuator to the second position from the first position and thereby enabling the hammer mode.*

*26. The mode control of claim 25 further comprising:*

*a hammer mode actuator spring for biasing the hammer mode actuator to the first position to disable the hammer mechanism;*

*the nose ring comprises a ledge engageable with first and second sides of the hammer mode actuator arm;*

*the ledge located adjacent to the first side of the arm in a first of the driver mode settings;*

*the ledge located adjacent to the second side of the arm in the drill setting; and*

*the ledge moving the arm from the first position wherein the hammer mode is disabled to the second position wherein the hammer mode is enabled when the nose ring is moved from the drill mode setting to the hammer mode setting.*

*27. A mode control for setting the mode operation of a power tool (1) having a hammer mechanism and an epicycle gear box and (2) having hammer, drill and driver modes, the mode control comprising:*

*a subhousing for the hammer mechanism;*

*the subhousing having a front end a rear end, a sidewall extending between the front and rear ends and an opening in the sidewall;*

*a clutch actuator mounted adjacent to rear end of the subhousing and engageable with the gear box to adjust the torque output of the gear box in the driver mode and to set the gear box in the drill mode;*

*an actuator spring resiliently biasing the actuator;*

*a control ring adjustably mounted adjacent to the front end of the subhousing for setting the spring tension applied by the actuator spring on the actuator and thereby the torque output of the gear box;*

*a hammer mode actuator located in the subhousing between the front and rear ends, having an arm extending through the opening in the subhousing sidewall, and shiftable between a first position wherein the*

*hammer mode is disabled to a second position wherein the hammer mechanism is enabled and*

*a nose ring assembly rotatably mounted on the subhousing, engageable with the control ring to set the torque output of the gear box and engageable with the hammer mode actuator arm to shift the hammer mode actuator between the first and second positions to enable and disable the hammer mechanism.*

*28. The mode control of claim 27 wherein:*

*the nose ring assembly comprises a first nose ring engaged with the control ring and a second nose ring engaged with the hammer mode actuator arm.*

*29. The mode control of claim 27 wherein:*

*the nose ring assembly comprises a single nose ring for operating both the control ring and the hammer mode actuator arm.*

*30. A power tool having hammer, drill and driver modes comprising:*

*a main housing;*

*a motor in the housing;*

*a gear box connected to and driven by the motor;*

*a combination mechanism selectively operating in hammer, drill and driver modes and comprising:*

*a subhousing;*

*a chuck shaft connected to and driven by the gear box;*

*the chuck shaft rotatably and axially slidably mounted in the housing body;*

*hammer mechanism located in the subhousing and comprising;*

*a first ratchet fixed to the chuck shaft;*

*a second ratchet fixed relative to the housing body when in the hammer mode to cause the chuck shaft to axially reciprocate;*

*a cam having a first position to disable the hammer mode and a second position to enable the hammer mode;*

*a torque control clutch lockable in the drill mode, settable in a plurality of torque settings in the driver mode, mounted on the subhousing and comprising:*

*an actuator engageable with the gear box to adjust the torque output of the gear box to the chuck shaft in the driver mode and to set the gear box in the drill mode;*

*a control ring adjustably mounted on the subhousing for setting the actuator and thereby the torque output of the gear box; and*

*a nose ring rotatably mounted on the subhousing, engageable with the control ring to set the torque output of the gear box and engageable with the cam to shift the cam between the first and second positions to enable and disable the hammer mechanism.*

*31. The power tool of claim 30 wherein:*

*the second ratchet is axially shiftable in the subhousing toward and away from the first ratchet; and*

*the cam, when shifted from the first position to the second deposition, shifts the second ratchet to a location wherein the second ratchet is engaged by the first ratchet to enable the hammer mechanism.*

*32. The power tool of claim 30 wherein:*

*the subhousing has a sidewall and an opening in the sidewall;*

*the cam has an arm extending through the opening; and*

*the nose ring engages the arm to shift the cam between first and second positions.*

* * * * *